US008591081B2

(12) United States Patent
Inaba

(10) Patent No.: US 8,591,081 B2
(45) Date of Patent: Nov. 26, 2013

(54) LIGHT EMITTING DEVICE MODULARIZING MEMBER AND LAMP UNIT

(75) Inventor: Tetsuaki Inaba, Shizuoka (JP)

(73) Assignee: Koito Manufacturing Co., Ltd., Shizouka (JP)

( * ) Notice: Subject to any disclaimer, the term of this patent is extended or adjusted under 35 U.S.C. 154(b) by 0 days.

(21) Appl. No.: 12/749,395

(22) Filed: Mar. 29, 2010

(65) Prior Publication Data

US 2010/0244649 A1 Sep. 30, 2010

(30) Foreign Application Priority Data

Mar. 31, 2009 (JP) ................................ 2009-086887

(51) Int. Cl.
*H01K 1/58* (2006.01)
*B60Q 1/00* (2006.01)
*H01R 13/62* (2006.01)

(52) U.S. Cl.
USPC ............................ 362/460; 362/547; 439/366

(58) Field of Classification Search
USPC .............. 313/46; 362/507, 545, 547; 439/366
See application file for complete search history.

(56) References Cited

U.S. PATENT DOCUMENTS

2004/0179359 A1* 9/2004 Miyawaki et al. ............ 362/230
2007/0076422 A1* 4/2007 Nicolai ......................... 362/547
2007/0091632 A1* 4/2007 Glovatsky et al. ............ 362/547
2007/0127257 A1* 6/2007 Erion et al. ................... 362/547
2007/0177401 A1* 8/2007 Nakabayashi ................ 362/548
2007/0254519 A1* 11/2007 Wu et al. ....................... 439/366
2007/0279927 A1* 12/2007 Yamamichi et al. .......... 362/545
2009/0129083 A1* 5/2009 An ................................. 362/243
2010/0072505 A1* 3/2010 Gingrich, III .................. 257/99

FOREIGN PATENT DOCUMENTS

| | | | |
|---|---|---|---|
| EP | 2 039 992 | A1 | 3/2009 |
| EP | 2 182 274 | A2 | 10/2009 |
| EP | 1 748 252 | A2 | 7/2010 |
| JP | 2006-107875 | | 4/2006 |
| JP | 2007-035547 | | 2/2007 |
| JP | 2007207528 | A | 8/2007 |
| JP | 2009-004309 | | 1/2009 |
| KR | 1020070101154 | A | 10/2007 |
| KR | 1020080061305 | A | 7/2008 |

OTHER PUBLICATIONS

SIPO, English translation of First Office Action in Chinese Patent Application No. 201010157804.4 issued Nov. 16, 2011.
SIPO, English Translation of Office Action Apr. 23, 2012 in Chinese Patent Appln. 201010157804.4.
Chinese Office Action, Oct. 30, 2012, 10 pages.
JPO, Office Action in counterpart Japanese Patent Application No. 2009-086887 dated Apr. 2, 2013.
JPO, Office Action in counterpart Japanese Patent Application No. 2009-086887 dated Jul. 30, 2013.

* cited by examiner

*Primary Examiner* — Anh Mai
*Assistant Examiner* — Michael Santonocito
(74) *Attorney, Agent, or Firm* — Fulwider Patton LLP

(57) ABSTRACT

A LED is modularized by a light emitting device modularizing member. The light emitting device modularizing member includes heatsink having planar base, a LED mounting plate extending perpendicularly to the base from a portion closer to the end than to the middle portion of the base, and a light emitting device holder provided on each of a first face of the LED mounting plate, which is a face facing the middle portion of the base, and a second face of the LED mounting plate, which is a face opposite to the first face.

7 Claims, 11 Drawing Sheets

LIGHT EMITTING DEVICE MODULARIZING MEMBER AND LAMP UNIT

CROSS-REFERENCE TO RELATED APPLICATION

This application is based upon and claims the benefit of priority from the prior Japanese Patent Application No. 2009-086887, filed on Mar. 31, 2009, the entire content of which is incorporated herein by reference.

BACKGROUND OF THE INVENTION

1. Field of the Invention

The present invention relates to a light emitting device modularizing member for modularizing a light emitting device, such as an LED (light emitting diode), and a lamp unit using said light emitting device modularizing member.

2. Description of the Related Art

In the conventional practice there are automotive lamps using light emitting devices, such as LEDs, as the light source (See patent document No. 1 and No. 2, for instance).

[patent document No. 1] JP 2007-35547.

[patent document No. 2] JP 2009-4309.

Normally, when LEDs are used as the light source of automotive lamps, heat radiation is effected by a heatsink on which a plurality of LEDs are mounted. To efficiently radiate the heat produced by the plurality of LEDs, the volume of the heatsink tends to be extremely large. Should even one of the LEDs stop working, the whole heatsink of a considerable size must be removed from the automotive lamp to exchange the faulty LED with a new one. This presents a problem of troublesome procedure in the handling of light emitting devices in automotive lamps.

SUMMARY OF THE INVENTION

The present invention has been made in view of the foregoing circumstances, and a purpose thereof is to provide a light emitting device modularizing member capable of making the handling of light emitting devices, such as LEDs, easier and a lamp unit incorporating such a light emitting device modularizing member.

To resolve the foregoing problems, a light emitting device modularizing member according to one embodiment of the present invention is a light emitting device modularizing member for modularizing a light emitting device, and it comprises: a heatsink having a planar base; a light emitting device mounting plate extending perpendicularly to the base from a portion closer to an end than to a middle portion of the base; and a light emitting device holder provided on each of a first face of the light emitting device mounting plate, which is a face facing the middle portion of the base, and a second face thereof, which is a face opposite to the first face.

Another embodiment of the present invention relates to a lamp unit. The lamp unit has a first light emitting device modularizing member and a second light emitting device modularizing member wherein the first light emitting device modularizing member and the second light emitting device modularizing member are disposed such that a first face of a light emitting device mounting plate of the first light emitting device modularizing member and a second face of a light emitting device mounting plate of the second light emitting device modularizing member face each other, and wherein light emitting devices are mounted on the light emitting device mounting plate of the first light emitting device modularizing member and the light emitting device mounting plate of the second light emitting device modularizing member, respectively, such that light emitting directions thereof are opposite to each other.

Still another embodiment of the present invention relates also to a lamp unit. The lamp unit has a first light emitting device modularizing member and a second light emitting device modularizing member, wherein the first light emitting device modularizing member and the second light emitting device modularizing member are disposed such that a second face of a light emitting device mounting plate of the first light emitting device modularizing member and a second face of a light emitting device mounting plate of the second light emitting device modularizing member face each other, and wherein light emitting devices are mounted on the light emitting device mounting plate of the first light emitting device modularizing member and the light emitting device mounting plate of the second light emitting device modularizing member, respectively, such that light emitting directions thereof are opposite to each other.

Still another embodiment of the present invention relates also to a lamp unit. The lamp unit has the above-described light emitting device modularizing member, wherein light emitting devices are mounted on the first face and the second face of the light emitting device mounting plate of the light emitting device modularizing member, respectively, such that light emitting directions thereof are opposite to each other.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

Hereinbelow, a detailed description will be given of automotive lamps according to embodiments with reference to the drawings.

Figure 1:
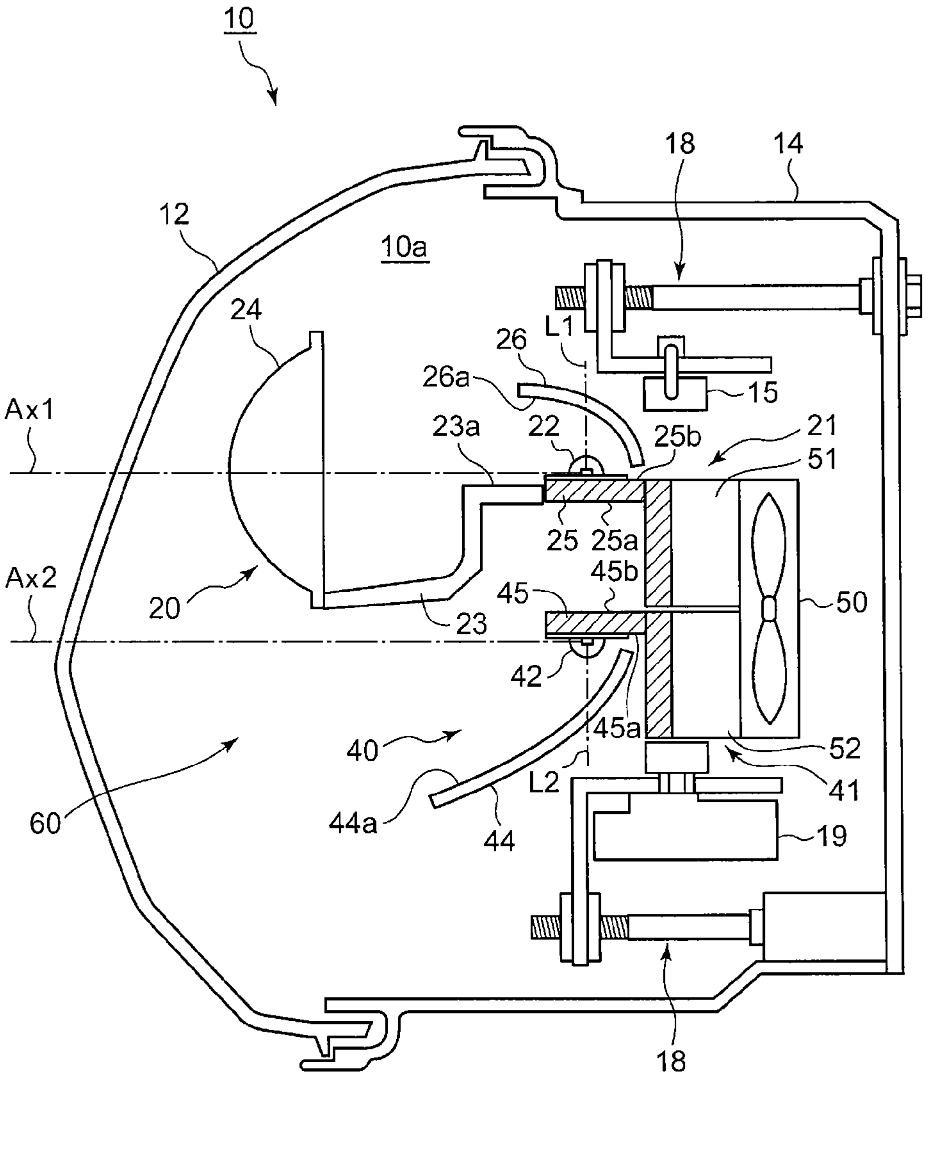
FIG. 1 is a schematic cross-sectional view of an automotive lamp according to an embodiment of the present invention.

FIG. 1 is a schematic cross-sectional view of an automotive lamp 10 according to an embodiment of the present invention. The automotive lamp 10 is installed in a front end part of a vehicle, for instance, and is a headlamp for enabling the turning on and off of a passing beam.

As shown in FIG. 1, the automotive lamp 10 includes a translucent cover 12 having optical transparency and a lamp body 14. A lamp unit 60 is housed in a lamp chamber 10*a* enclosed by the translucent cover 12 and the lamp body 14.

Figure 2:
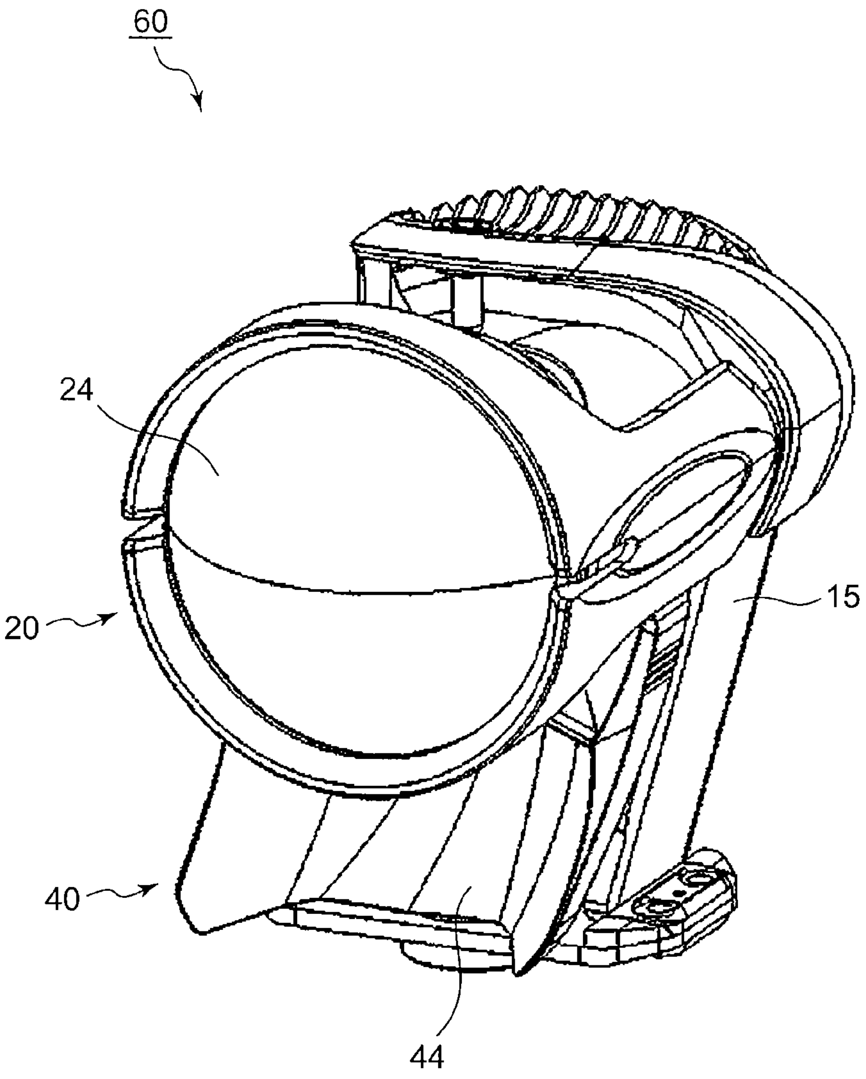
FIG. 2 is a perspective view of a lamp unit as viewed from the front thereof.
Figure 3:
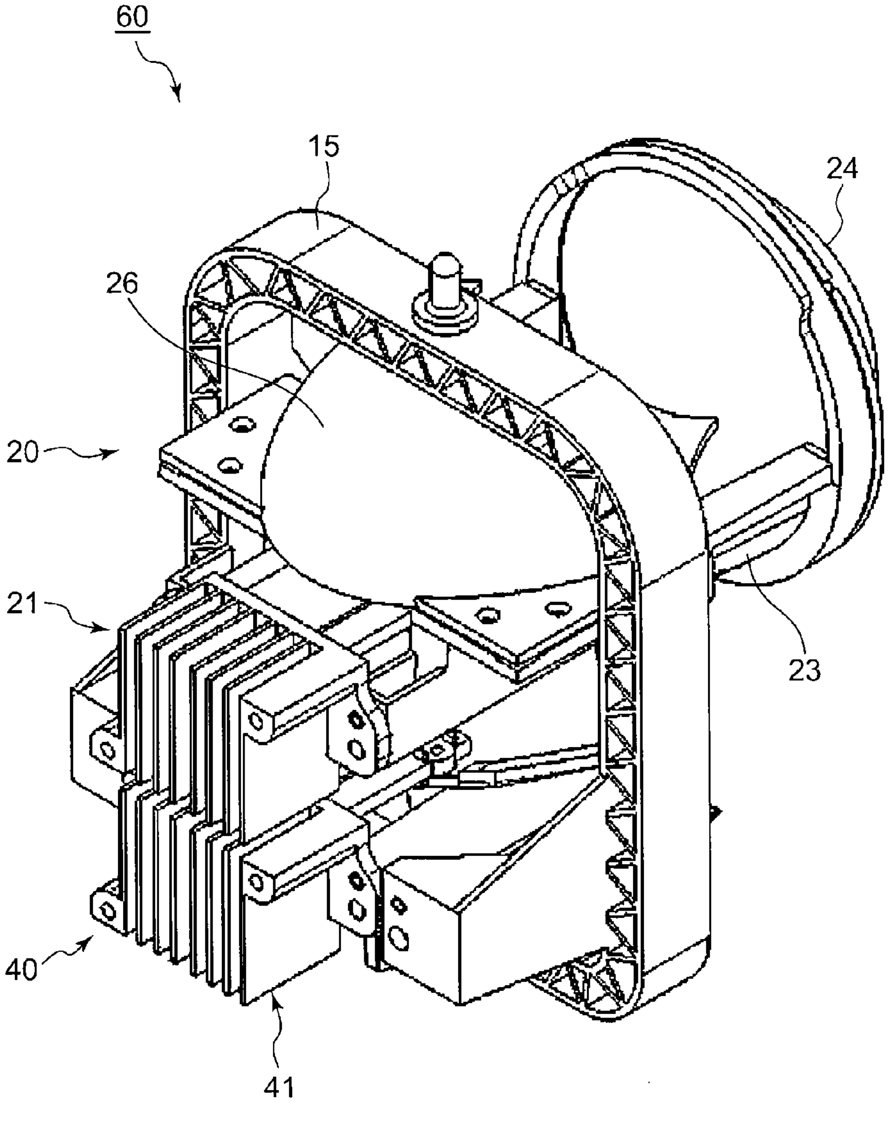
FIG. 3 is a perspective view of a lamp unit as viewed from the rear thereof.
Figure 4:
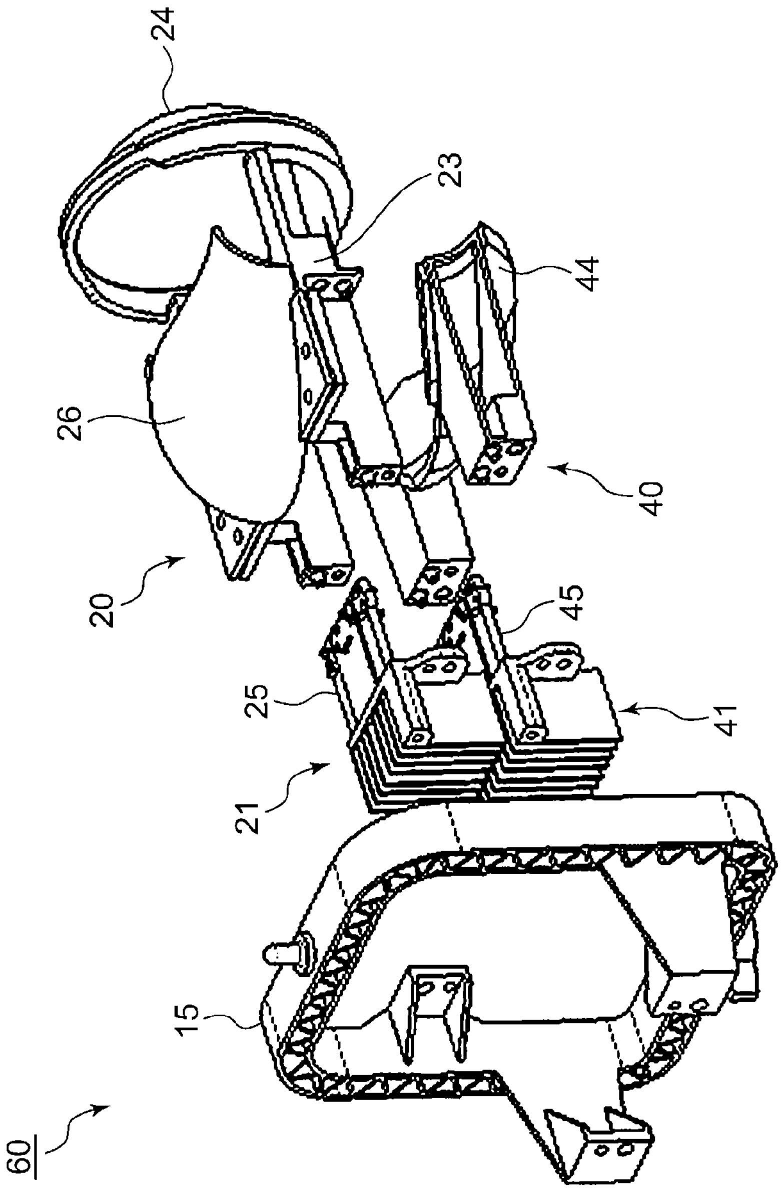
FIG. 4 is an exploded perspective view of a lamp unit.

FIG. 2 is a perspective view of the lamp unit 60 as viewed from the front thereof. FIG. 3 is a perspective view of the lamp unit 60 as viewed from the rear thereof. FIG. 4 is an exploded perspective view of the lamp unit 60.

As shown in FIG. 1 to FIG. 4, the lamp unit 60 includes two sub-lamp units which are a first sub-lamp unit 20 and a second sub-lamp unit 40. The lamp unit 60 has a support member 15 which is a frame body for supporting the first sub-lamp unit 20 and the second sub-lamp unit 40. The support member 15, which is fixed to the lamp body 14 via a leveling mechanism shown in FIG. 1, is structured such that the support member 15 can adjust a light axis of each sub-lamp unit in vertical directions. Also, a swivel mechanism 19 is connected to the support member 15, so that the light axis of each sub-lamp unit can be adjusted in horizontal directions.

A description is now given of the first sub-lamp unit 20 and the second sub-lamp unit 40. Firstly, the first sub-lamp unit 20 is described followed by the second-lamp unit 40. The first sub-lamp unit 20 is a so-called projector-type lamp unit and has a function of irradiating a light condensing spot of the passing beam.

As shown in FIG. 1, the first sub-lamp unit 20 includes a first LED module 21 having a first LED 22 which functions as a first light source, a first reflector 26 which reflects the light emitted from the first LED 22 in a frontward direction, a base member 23 disposed in a front part of the first LED module 21, and a projection lens 24 held by the base member 23.

The first LED 22 is a white-color light emitting diode having a light emitting part (light emitting chip) of an approximately square shape with the side length of about 1 mm. Also, the first LED 22 is placed on a first LED mounting plate 25 such that an irradiation axis L1 thereof faces an approximately vertical upward direction which is approximately perpendicular to a light axis Ax1 of the first sub-lamp unit 20 extending in the longitudinal directions of a vehicle. The first LED module 21 will be discussed later.

The first reflector 26 is a reflective member with a reflective surface 26*a* formed thereinside. The reflective surface 26*a* has a shape of an elliptical sphere in a vertical cross section and a shape of an ellipse-based free curved surface in a horizontal cross section. The first reflector 26 is placed such that a first focal point thereof is in the vicinity of a light emitting part of the first LED 22 and a second focal point thereof is in the vicinity of an end of a horizontal plane 23*a* in the base member 23. The end of the horizontal plane 23*a* in the base member 23 is configured such that the light reflected from the first reflector 26 is so selectively cut as to form oblique cutoff lines in a light distribution pattern projected toward a front area of the vehicle.

The projection lens 24, which is a planoconvex aspheric lens having a convex front surface and a plane rear surface, is fixed in a position close to an end of the base member 23 on a front end side of the vehicle. In the present embodiment, a rear-side focal point of the projection lens 24 is so arranged as to be nearly identical to the second focal point of the first reflector 26. The projection lens 24 projects a light source image formed on a rear-side focal plane toward a front area of the automotive lamp 10 as a reverted image.

The second sub-lamp unit 40 is now described. The second sub-lamp unit 40 is disposed below the first sub-lamp unit 20 and has a function of irradiating a diffusion spot of the passing beam.

The second sub-lamp unit 40 is a so-called parabola-type lamp unit. As shown in FIG. 1, the second sub-lamp unit 40 includes a second LED module 41 having a second LED 42 which functions as a second light source and a second reflector 44 which reflects the light emitted from the second LED 42 in the frontward direction.

Similar to the first LED 22, the second LED 42 is a white-color light emitting diode having a light emitting part and is placed on a second LED mounting plate 45 such that an irradiation axis L2 thereof faces an approximately vertical downward direction which is approximately perpendicular to a light axis Ax2 of the second sub-lamp unit 40 extending in the longitudinal directions of the vehicle. The second LED module 41 will be discussed later.

The second reflector 44 reflects light emitted from the second LED 42, and a reflective surface 44*a* is so formed thereinside that a predetermined light pattern is irradiated toward a front area of the vehicle.

A description is now given of the first LED module 21 and the second LED module 41 used in the first sub-lamp unit 20 and the second sub-lamp unit 40, respectively. Hereinafter, the first LED module 21 and the second LED module 41 will be generically referred to as "LED module 70" and described accordingly.

Normally, when LEDs are used as the light source of automotive lamps, heat radiation is effected by a heatsink on which a plurality of LEDs are mounted. To efficiently radiate the heat produced by the plurality of LEDs, the volume of the heatsink tends to be extremely large. Should even one of the LEDs stop working, the whole heatsink of a considerable size must be removed from the automotive lamp to exchange the faulty LED with a new one. This makes the handling of light emitting devices in automotive lamps difficult.

In the present embodiment, therefore, LEDs are modularized such that one LED modularizing member is set for each LED. As a result, for example, an LED module is replaced as a whole if it fails to operate properly, so that the LEDs can be handled easily.

Such an LED preferably has a shape applicable to various optical systems conceivable in connection with the automotive lamps employing LEDs so that the same LED module can be used even if the optical system of the automotive lamp varies from one vehicle to another. Standardizing the LED modules to be applicable to various types of automotive lamps can reduce the cost by the mass production thereof.

Figure 5:
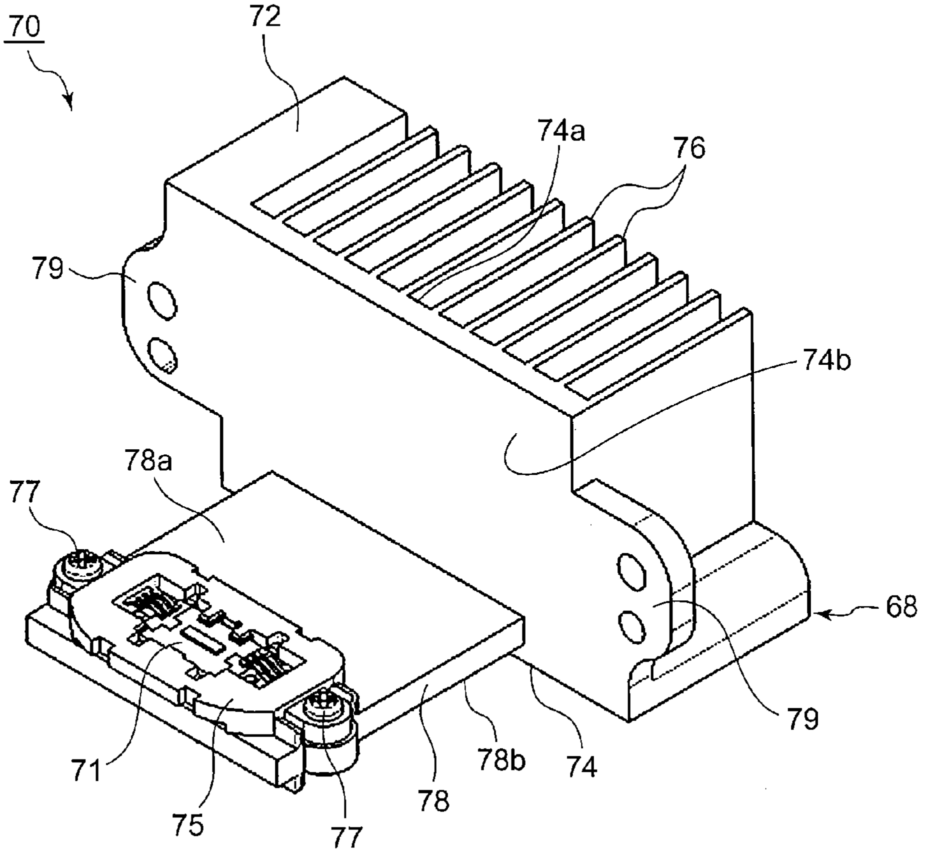
FIG. 5 is a perspective view of an LED module as viewed from the front thereof.
Figure 6:
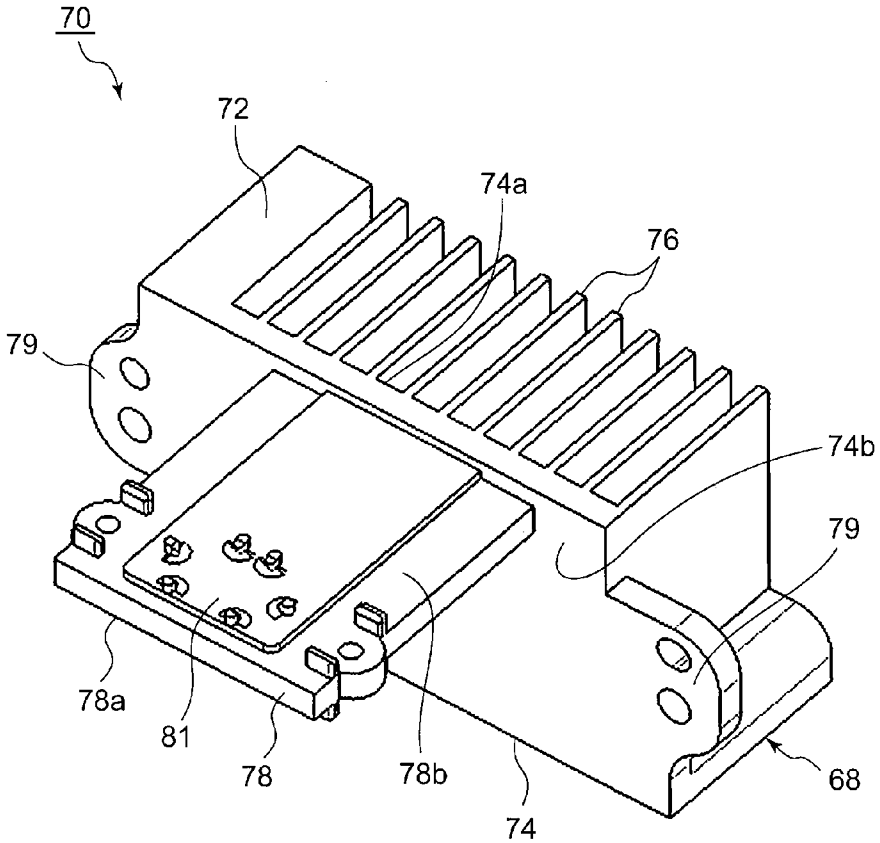
FIG. 6 is a perspective view of an LED module as viewed from underneath thereof.
Figure 7:
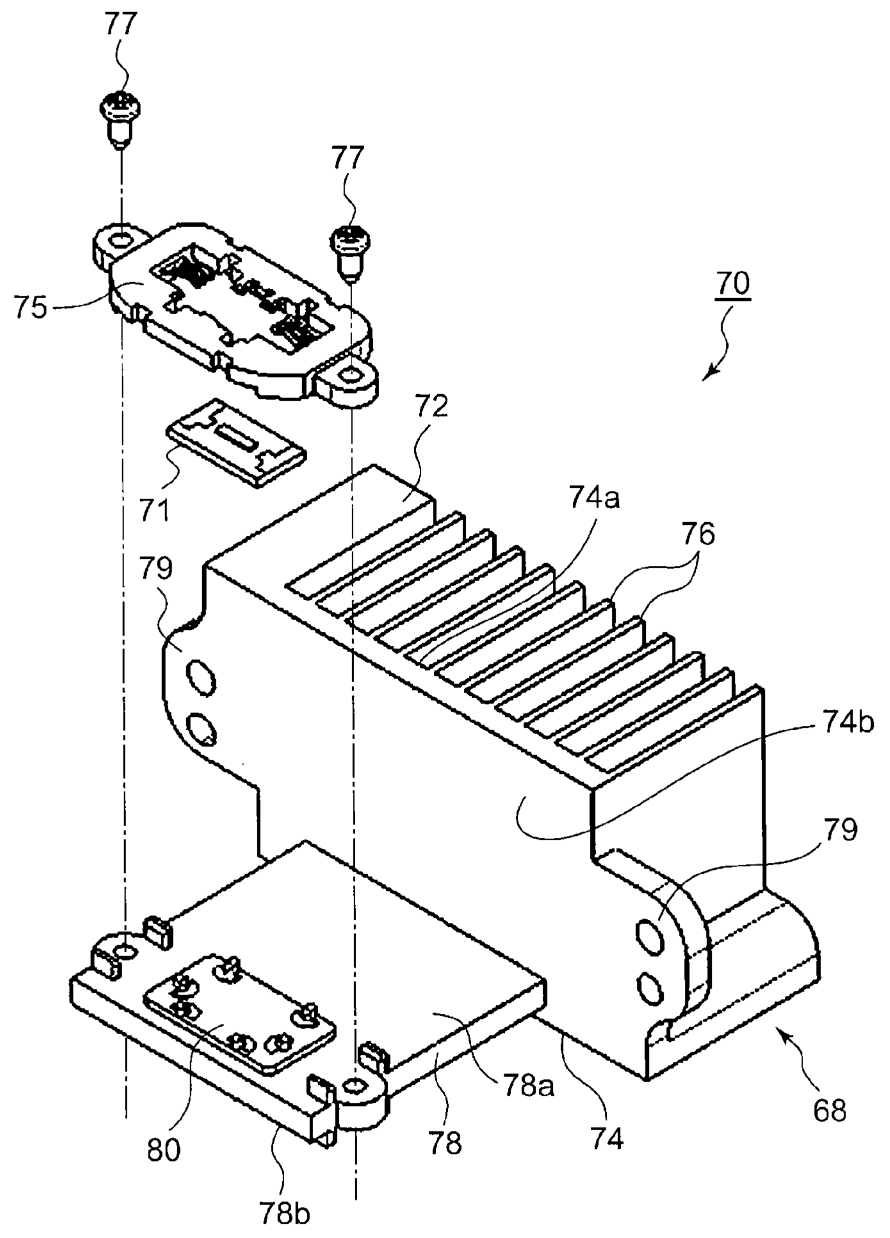
FIG. 7 is an exploded perspective view of an LED module.

FIG. 5 is a perspective view of the LED module 70 as viewed from the front thereof. FIG. 6 is a perspective view of the LED module 70 as viewed from underneath thereof. FIG. 7 is an exploded perspective view of the LED module 70.

As shown in FIG. 5 to FIG. 7, an LED module 70 is of such a structure that an LED 71 is mounted on an LED modularizing member 68. The LED modularizing member 68 comprises a heatsink 72, an LED mounting plate 78, a first-face LED holder 80, a second-face LED holder 81, a pressing member 75, a mount section 79, and screws 77.

The heatsink 72, which is formed of aluminum or other metal having a high thermal conductivity, includes a base 74 and plates fins 76. The base 74 is a plate-like member formed in an approximately rectangular shape, and is comprised of a plurality of plate fins 76 disposed upright on a back face 74*a* thereof. The shape of the fins is not limited to any particular one and, for example, rod-like fins may be provided.

The mounting section 79, which is used when the LED module 70 is assembled into the automotive lamp 10 as shown in FIG. 1 to FIG. 4, is provided at both ends in the longitudinal direction of the base 74. Each mounting section 79 is provided with through-holes through which screws are securely tightened to the automotive lamp 10.

The LED mounting plate 78 is provided on a front face 74*b* of the base 74. The LED mounting plate 78 extends perpendicularly to the base 74 from a portion closer to an end than to a middle portion of the base 74. In the present embodiment, the LED mounting plate 78 extends in a direction approximately perpendicular to the base 74 from one end (lower end) of a short side of the front face 74*b* of the base 74. The LED mounting plate 78, which is a plate-like member formed in an approximately rectangular shape, may be formed integrally with the heatsink 72.

The first-face LED holder 80 and the second-face LED holder 81 for supporting the LED 71 are provided on the both faces (first face 78*a* and second face 78*b*) of the LED mounting plate 78, respectively. Note that the face facing the middle portion of the base 74 is called the first face 78*a* whereas the face opposite to the first face 78*a* is called the second face 78*b*.

To mount the LED 71 on the LED mounting plate 78, the LED 71 is engaged with a pin-like member provided on the first-face LED holder 80 or second-face LED holder 81. Then the LED 71 is pressed against the first-face LED holder 80 or second-face LED holder 81 using the pressing member 75. Then the pressing member 75 is securely tightened to the LED mounting plate 78 using the screws 77. This mounts the LED 71 on the LED mounting plate 78. FIG. 5 to FIG. 7 illustrate how the LED 71 is mounted on the first-face LED holder 80. It is preferable that the first-face LED holder 80 and the second-face LED holder 81 are disposed symmetrical with each other with respect to the LED mounting plate 78. This makes the layout design of optical systems easier.

As described above, in the present embodiment a configuration is such that a single LED is mounted on a single LED modularizing member. Thus, each LED can be treated as a single module. As a result, if a single LED becomes faulty, this single LED module only may be replaced anew, so that the LED light source can be handled easily.

The size of the heatsink 72, the shape of the plate fins 76 and the like are designed, as appropriate, according to the amount of heat produced by the LED 71 to be mounted, whether a fan is provided or not, whether the LED 71 is to be mounted on the both faces of the LED mounting plate 78 or not, and the like. For example, where the automotive lamp 10 uses a fan for forced air cooling, the size of heatsink required therefor is larger than that required for natural air cooling.

Now a description will be given of various lamp units using the LED module. Referring back to FIG. 1, the lamp unit 60 has a first sub-lamp unit 20, which incorporates a first LED module 21, and a second sub-lamp unit 40, which incorporates a second LED module 41. The first LED module 21 and the second LED module 41 are of the same constitution as that of the LED module 70 described with reference to FIG. 5 to FIG. 7.

The first LED module 21 and the second LED module 41 are disposed vertically adjacent to each other such that a first face 25*a* of the first LED mounting plate 25 and a second face 45*b* of the second LED mounting plate 45 face each other. Also, a second face 25*b* of the first LED mounting plate 25 and the second face 45*b* of the second LED mounting plate 45 both face the upward direction of the lamp.

The first LED module 21 has a first LED 22 mounted on the second face 25*b* of the first LED mounting plate 25, whereas the second LED module 41 has a second LED 42 mounted on the first face 45*a* of the second LED mounting plate 45. In this manner, the first LED 22 and the second LED 42 are mounted such that their light emitting directions are opposite to each other.

The lamp unit 60 has a fan 50 disposed at the back of the heatsink 51 of the first LED module 21 and the heatsink 52 of the second LED module 41 for forced air cooling of the heatsinks 51 and 52. Although a single fan 50 is used to effect a forced air cooling of both the heatsinks 51 and 52 in FIG. 1, the arrangement may be such that a fan may be provided for each of the heatsinks 51 and 52. Where a single fan is to be used, the first LED module 21 and the second LED module 41 should preferably be disposed as close to each other as practicable in order to raise the cooling efficiency.

As is evident from the above-described structure, the use of the first LED module 21 and the second LED module 41 together can make the handling of the LEDs easier. For example, if the first LED 22 fails, the first LED module 21 can be removed as a module from the lamp unit 60 and a new first LED module 21 can be installed on the lamp unit 60.

Figure 8:
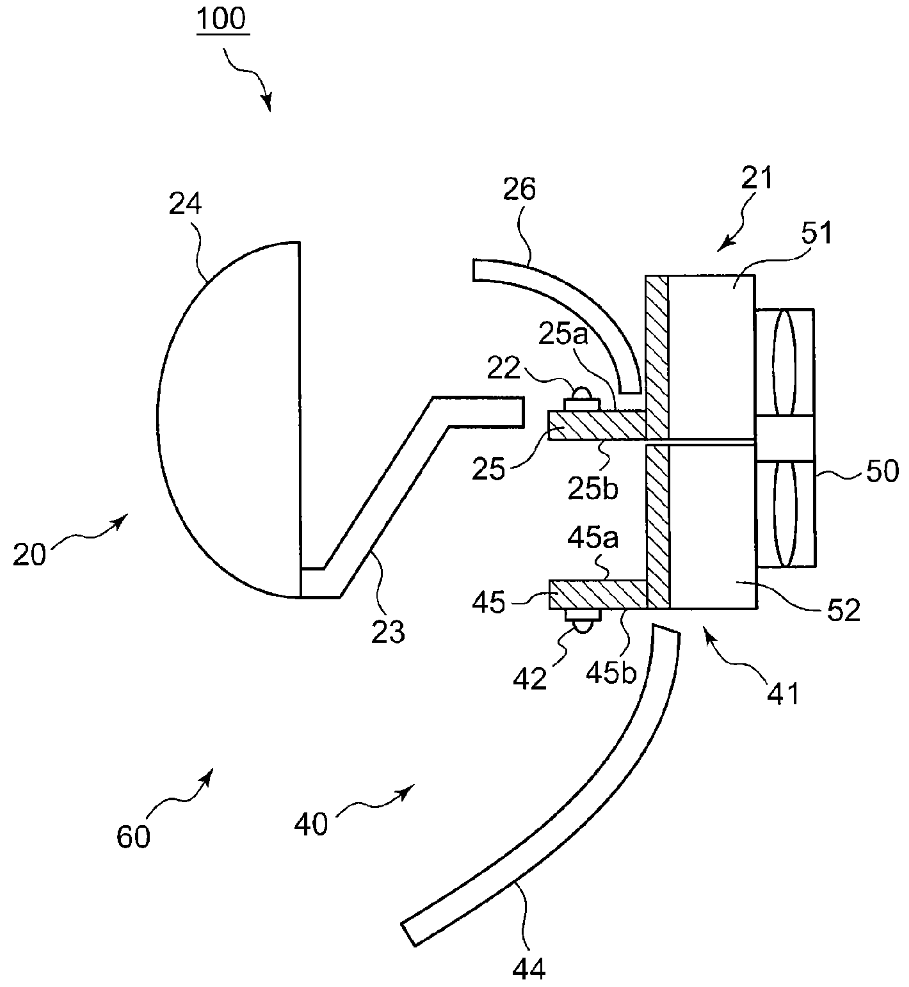
FIG. 8 is a schematic cross-sectional view of an automotive lamp according to another embodiment of the present invention.

FIG. 8 is a schematic cross-sectional view of an automotive lamp 100 according to another preferred embodiment of the present invention. In FIG. 8, the same or corresponding components as or to those of the automotive lamp 10 shown in FIG. 1 are denoted with the same reference numerals as those therein, and the description thereof will be omitted as appropriate. Note also that in FIG. 8, only principal components of the lamp unit 60 are shown, with the others such as the translucent cover and the lamp body not shown.

In the automotive lamp 100 of the present embodiment, too, a first LED module 21 is used on the first sub-lamp unit 20, and a second LED module 41 on the second sub-lamp unit 40.

According to the present embodiment, the first LED module 21 and the second LED module 41 are disposed vertically adjacent to each other such that a second face 25*b* of the first LED mounting plate 25 and a first face 45*a* of the second LED mounting plate 45 face each other. A first face 25*a* of the first LED mounting plate 25 and the first face 45*a* of the second LED mounting plate 45 both face the upward direction of the lamp.

The first LED module 21 has a first LED 22 mounted on the first face 25*a* of the first LED mounting plate 25, whereas the second LED module 41 has a second LED 42 mounted on the second face 45*b* of the second LED mounting plate 45. In this manner, the first LED 22 and the second LED 42 are mounted such that their light emitting directions are opposite to each other. A fan 50 is disposed at the back of the first LED module 21 and the second LED module 41.

Since the heatsink 52 has the base in the automotive lamp 10 shown in FIG. 1, there is a limit to enlarging the F value of the second reflector 44 of the second sub-lamp unit 40. However, disposition of the first LED module 21 and the second LED module 41 as in the present embodiment will remove the limit due to the base of the heatsink 52. Therefore, the second reflector 44 of the second sub-lamp unit 40 can have a larger F value.

Figure 9:
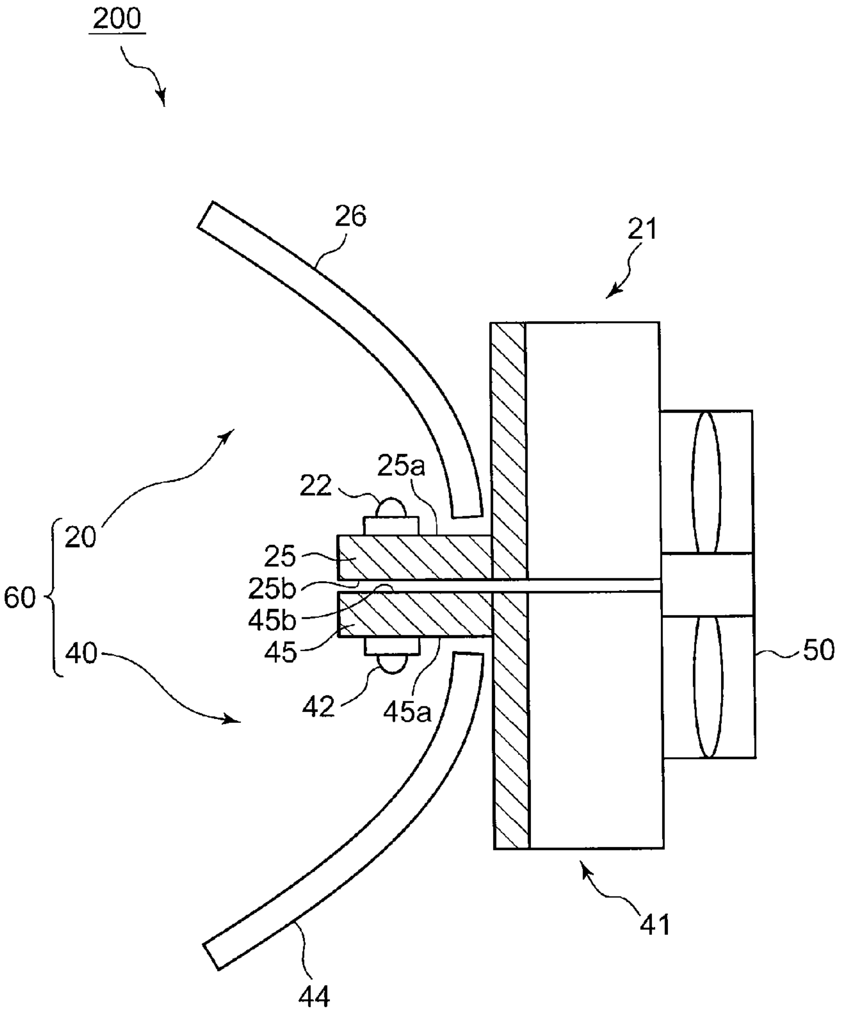
FIG. 9 is a schematic cross-sectional view of an automotive lamp according to still another embodiment of the present invention.

FIG. 9 is a schematic cross-sectional view of an automotive lamp 200 according to still another embodiment of the present invention. Note that in FIG. 9, only principal components of a lamp unit 60 are shown, with the others such as the translucent cover and the lamp body not shown.

Also in the automotive lamp 200 shown in FIG. 9, the lamp unit 60 is comprised of a first sub-lamp unit 20 and a second sub-lamp unit 40. In this embodiment, the first sub-lamp unit 20 and the second sub-lamp unit 40 are both parabola-type lamp units, and a first reflector 26 and a second reflector 44 of the same shape are mounted respectively thereon.

According to the present embodiment, the first LED module 21 and the second LED module 41 are disposed vertically adjacent to each other such that a second face 25*b* of the first LED mounting plate 25 and a second face 45*b* of the second LED mounting plate 45 face each other. A first face 25*a* of the first LED mounting plate 25 faces upward, whereas a first face 45*a* of the second LED mounting plate 45 faces downward.

The first LED module 21 has a first LED 22 mounted on the first face 25*a* of the first LED mounting plate 25, whereas the second LED module 41 has a second LED 42 mounted on the first face 45*a* of the second LED mounting plate 45. In this manner, the first LED 22 and the second LED 42 are mounted such that their light emitting directions are opposite to each other. Also, a fan 50 is disposed at the back of the first LED module 21 and the second LED module 41.

Figure 10:
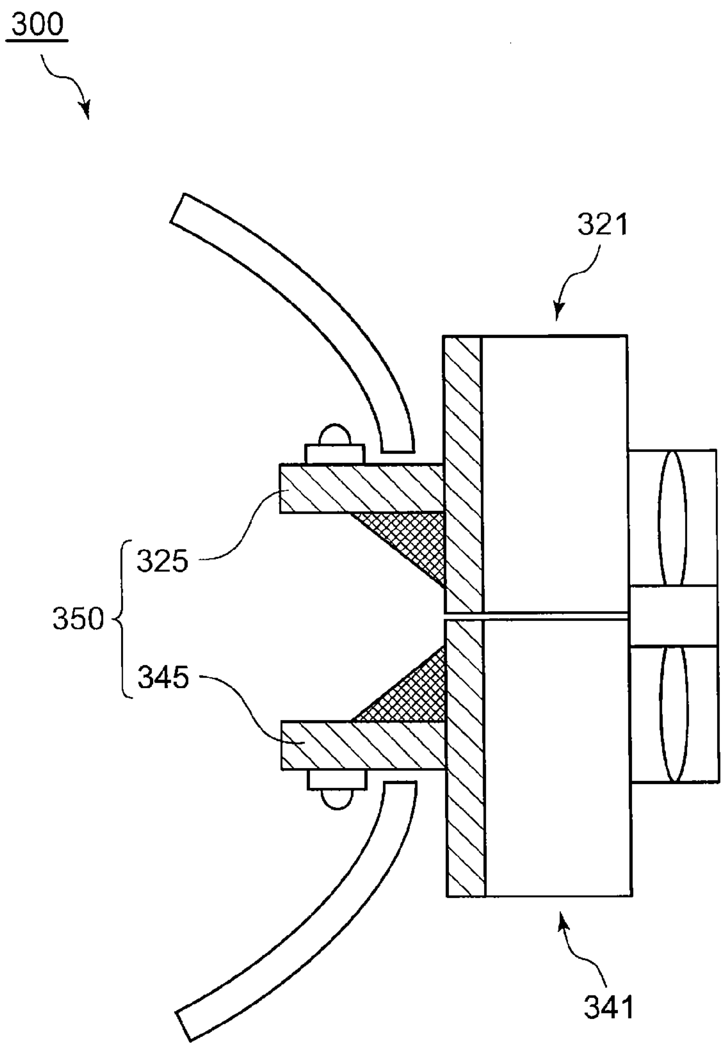
FIG. 10 is an illustration showing an automotive lamp according to a comparative example.

Constitution of the automotive lamp 200 with the first LED module 21 and the second LED module 41 disposed as described above will realize an automotive lamp featuring the smallest possible non-light-emitting region. FIG. 10 is an illustration showing an automotive lamp 300 according to a comparative example. In the automotive lamp 300, both a first LED module 321 and a second LED module 341 have a first LED mounting plate 325 and a second LED mounting plate 345 respectively disposed in extension from the middle portions of base plates. If the first LED mounting plate 325 and the second LED mounting plate 345 are each disposed in extension from the middle portion of the base as in the example above, the non-light-emitting region will be large even if the first LED module 321 and second LED module 341 are arranged adjacent to each other. Such an arrangement is therefore not preferable for an automotive lamp.

On the other hand, according to the automotive lamp 200 in the present embodiment, the first LED mounting plate 25 and the second LED mounting plate 45 are each disposed in extension from a portion closer to the end than to the middle portion of the base of the first LED module 21 and the second LED module 41, respectively. Thus, as shown in FIG. 9, the non-light-emitting region can be made smaller if the first LED module 21 and the second LED module 41 are so arranged that the second face 25*b* of the first LED mounting plate 25 and the second face 45*b* of the second LED mounting plate 45 face each other.

Figure 11:
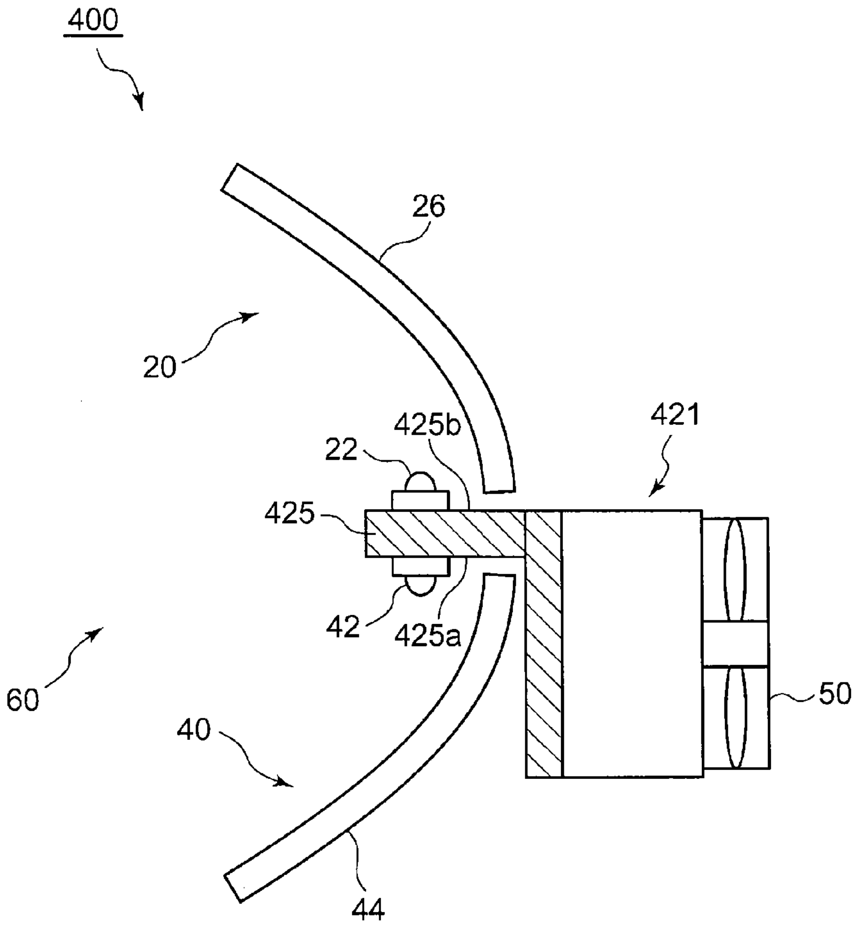
FIG. 11 is a schematic cross-sectional view of an automotive lamp according to still another embodiment of the present invention.

FIG. 11 is a schematic cross-sectional view of an automotive lamp 400 according to still another embodiment of the present invention. Note that in FIG. 11, only principal components of a lamp unit 60 are shown, with the others such as the translucent cover and the lamp body not shown.

Also in the automotive lamp 400 shown in FIG. 11, the lamp unit 60 is comprised of a first sub-lamp unit 20 and a second sub-lamp unit 40. In this embodiment, too, the first sub-lamp unit 20 and the second sub-lamp unit 40 are both parabola-type lamp units, and a first reflector 26 and a second reflector 44 of the same shape are mounted respectively thereon.

In this automotive lamp 400, a first LED 22, which is the light source of the first sub-lamp unit 20, and a second LED 42, which is the light source of the second sub-lamp unit 40, are mounted on a single LED module 421. More specifically, the first LED 22 is mounted on a second face 425*b* of a LED mounting plate 425 of the LED module 421, and the second LED 42 on a first face 425*a* thereof. The first LED 22 and the second LED 42 are mounted such that their light emitting directions are opposite to each other. Also, a fan 50 is disposed at the back of the LED module 421.

Thus, it is possible to constitute an automotive lamp with the LEDs mounted on both faces of the LED mounting plate 425 of the LED module 421. In this case, too, an automotive lamp with a small non-light-emitting region can be created.

Moreover, the reduced number of heatsinks leads to the lighter weight and lower cost of the automotive lamp. However, in view of the joint use of a single heatsink by the two LEDs, it is preferable that the automotive lamp 400 according to this embodiment is applied to the type of automotive illumination that does not light up the first LED 22 and the second LED 42 simultaneously. An example of such an application may be one in which the first sub-lamp unit 20 functions as a passing beam lamp and the second sub-lamp unit 40 as a daytime running lamp.

As the description with reference to FIGS. 1, 8, 9 and 11 suggests, a variety of optical systems for automotive illumination employing LEDs are conceivable using the LED modules according to the present embodiments. Since the LED modules can be applied to different optical systems without any design change, the module shapes can be standardized and the production cost can reduced.

The present invention has been described by referring to the preferred embodiments and such description is for illustrative purposes only. It is understood by those skilled in the art that various modifications to constituting elements and combinations thereof could be developed and that such modifications are also within the scope of the present invention.

In the foregoing embodiments, the light sources used are LEDs. However, other light emitting devices such as semiconductor lasers can be used instead. Also, in the embodiment as shown in FIG. 1, the first sub-lamp unit and the second sub-lamp unit are used in combination to emit the passing beam, but the types of beams to be emitted are not limited thereto. For example, the arrangement may be such that a driving beam is emitted by the combination of the first sub-lamp unit and the second sub-lamp unit or that a passing beam is emitted by the first sub-lamp unit and a driving beam by the second sub-lamp unit. Or the arrangement may be such that the first sub-lamp unit serves as the lamp unit for emitting passing beams, and the second sub-lamp unit as the lamp unit for emitting daytime running beams.

What is claimed is:

1. A light emitting device modularizing member for modularizing a light emitting device, the modularizing member comprising:

a heatsink having a planar base;

a light emitting device mounting plate extending perpendicularly to the base from a portion closer to an end than to a middle portion of the base; and a light emitting device holder provided on each of a first face of the light emitting device mounting plate, which is a face facing the middle portion of the base, and a second face thereof, which is a face opposite to the first face, wherein the light emitting device holder is provided with a pin-like member engaged with the light emitting device, wherein the light emitting device mounting plate is formed with a screw member configured to secure a pressing member for pressing the light emitting device, wherein the light emitting device is mounted on the light emitting device mounting plate by using the pressing member to press the light emitting device against the light emitting device holder while the pin-like member is engaged with the light emitting device, and by directly screwing the pressing member into the light emitting device mounting plate.

2. The light emitting device modularizing member according to claim 1, wherein a mounting unit for assembling the light emitting device modularizing member into an automotive lamp is provided at both ends of the base.

3. The light emitting device modularizing member according to claim 1, wherein a fan mounting unit for mounting a fan for forced-air cooling of the heatsink is provided at a back portion of the heatsink.

4. A light emitting device modularizing member according to claim 1, wherein the light emitting device holders provided on the first face and the second face, respectively, are disposed symmetrical with each other with respect to the light emitting device mounting plate.

5. A lamp unit having a first light emitting device modularizing member and a second light emitting device modularizing member according to claim 1, wherein the first light emitting device modularizing member and the second light emitting device modularizing member are disposed such that a first face of a light emitting device mounting plate of the first light emitting device modularizing member and a second face of a light emitting device mounting plate of the second light emitting device modularizing member face each other, and wherein light emitting devices are mounted on the light emitting device mounting plate of the first light emitting device modularizing member and the light emitting device mounting plate of the second light emitting device modularizing member, respectively, such that light emitting directions thereof are opposite to each other.

6. A lamp unit having a light emitting device modularizing member according to claim 1, wherein light emitting devices are mounted on the first face and the second face of the light emitting device mounting plate of the light emitting device modularizing member, respectively, such that light emitting directions thereof are opposite to each other.

7. A lamp unit according to claim 6, wherein the light emitting devices mounted on the first face and the second face thereof are controlled such that both of the light emitting devices do not light up simultaneously.

* * * * *